(12) United States Patent
Gupta et al.

(10) Patent No.: US 12,594,497 B2
(45) Date of Patent: Apr. 7, 2026

(54) VISUAL PERCEPTION ASSISTANCE APPARATUS AND METHOD

(71) Applicant: Sony Interactive Entertainment Inc., Tokyo (JP)

(72) Inventors: Rajeev Gupta, London (GB); Jason Craig Millson, London (GB); Patrick John Connor, London (GB); Maurizio Cerrato, London (GB); Christopher William Henderson, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 270 days.

(21) Appl. No.: 18/339,361

(22) Filed: Jun. 22, 2023

(65) Prior Publication Data

US 2024/0001233 A1 Jan. 4, 2024

(30) Foreign Application Priority Data

Jun. 29, 2022 (GB) ...................................... 2209511

(51) Int. Cl.
*A63F 13/525* (2014.01)
*A63F 13/52* (2014.01)

(52) U.S. Cl.
CPC ............ *A63F 13/525* (2014.09); *A63F 13/52* (2014.09)

(58) Field of Classification Search
CPC ........ A63F 13/50; A63F 13/52; A63F 13/525; A63F 13/5252; A63F 13/5255; A63F 13/5258; A63F 13/53; A63F 13/537; A63F 2300/303; A63F 2300/66
See application file for complete search history.

(56) References Cited

U.S. PATENT DOCUMENTS

| | | | | |
|---|---|---|---|---|
| 6,252,982 | B1* | 6/2001 | Haisma | ..................... G06T 5/90 |
| | | | | 345/422 |
| 2011/0304699 | A1* | 12/2011 | Ito | ........................ H04N 13/117 |
| | | | | 348/47 |
| 2015/0273336 | A1* | 10/2015 | Schmitt | ................. A63F 13/537 |
| | | | | 463/31 |

(Continued)

FOREIGN PATENT DOCUMENTS

| | | |
|---|---|---|
| EP | 2683169 A2 | 1/2014 |
| JP | 2000084252 A | 3/2000 |
| WO | 9605573 A1 | 2/1996 |

OTHER PUBLICATIONS

Extended European Search Report for corresponding EP Application 23178227.7, 7 pages, dated Nov. 30, 2023.

(Continued)

*Primary Examiner* — Omkar A Deodhar
(74) *Attorney, Agent, or Firm* — Kilpatrick Townsend & Stockton LLP

(57) ABSTRACT

A visual perception assistance apparatus includes a rendering unit configured to render, for display, a virtual environment, the virtual environment comprising one or more virtual elements; a selection unit configured to select one or more of the virtual elements; and an adapting unit configured to, for a given selected virtual element, adapt one or more aspects associated with an appearance of the given selected virtual element in dependence upon a distance between the given selected virtual element and a predetermined location within the virtual environment.

14 Claims, 2 Drawing Sheets

(56)                    References Cited

U.S. PATENT DOCUMENTS

| | | | | |
|---|---|---|---|---|
| 2015/0321103 A1* | 11/2015 | Barnett | ............... | H04N 13/344 |
| | | | | 345/419 |
| 2015/0352437 A1* | 12/2015 | Koseki | ............... | A63F 13/5255 |
| | | | | 463/31 |
| 2017/0178298 A1* | 6/2017 | Bonnier | ............... | H04N 13/122 |
| 2020/0175751 A1* | 6/2020 | Connor | ............. | G02B 27/0172 |
| 2020/0273434 A1* | 8/2020 | Iwata | ................... | H04N 13/356 |
| 2021/0195360 A1* | 6/2021 | Leider | ................... | A63F 13/285 |

OTHER PUBLICATIONS

Combined Search and Examination Report for corresponding Application GB2209511.1, 5 pages, dated Jan. 9, 2023.

\* cited by examiner

VISUAL PERCEPTION ASSISTANCE APPARATUS AND METHOD

FIELD OF INVENTION

The present invention relates to a visual perception assistance apparatus and method.

BACKGROUND

While the popularity of video games has increased in recent years, some people may find said video games to be inaccessible due to visual perception issues that they may have. As many of the interactions required in order to progress through a given video game (or otherwise experience certain moments therein) assume a full complement of visual perception capabilities, people with visual perception issues may find it difficult, if not impossible, to play the given video game.

The present invention seeks to alleviate or mitigate this issue.

SUMMARY OF THE INVENTION

In a first aspect, a visual perception assistance apparatus is provided in claim 1.

In another aspect, a visual perception assistance method is provided in claim 12.

Further respective aspects and features of the invention are defined in the appended claims.

BRIEF DESCRIPTION OF THE DRAWINGS

Embodiments of the present invention will now be described by way of example with reference to the accompanying drawings, in which.

DESCRIPTION OF THE EMBODIMENTS

A visual perception assistance apparatus and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, an entertainment system is a non-limiting example of such a visual perception assistance apparatus.

Figure 1:
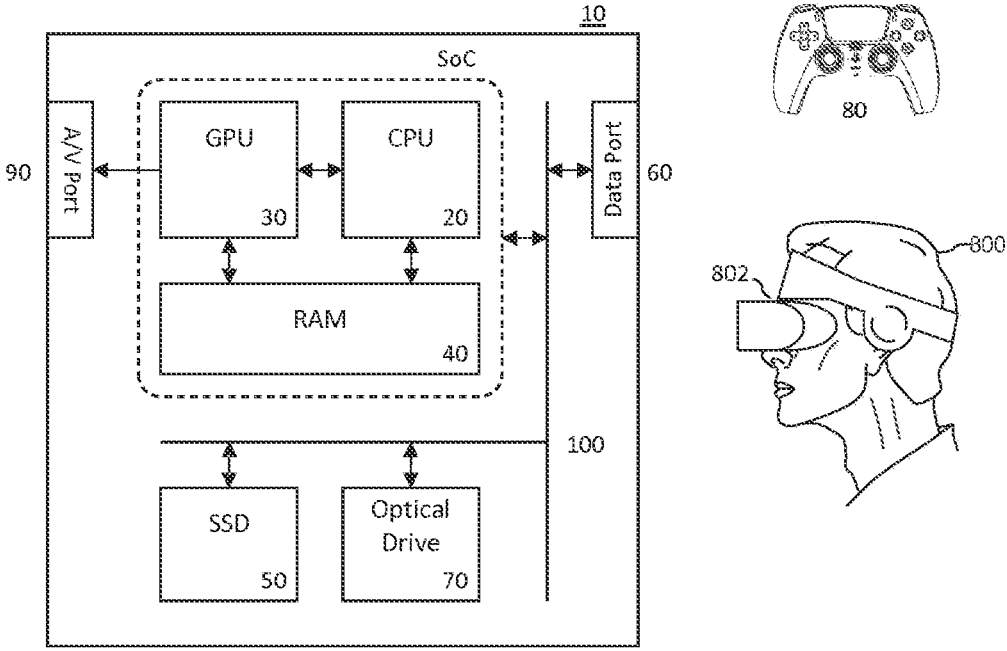
FIG. 1 schematically illustrates an entertainment system operable as a visual perception assistance apparatus according to embodiments of the present description.

Referring to FIG. 1, an example of an entertainment system 10 is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

As previously mentioned, people with visual perception issues may find it difficult, if not impossible, to play video games. Embodiments of the present description mitigate or alleviate a specific visual perception issue, namely depth perception. Depth perception is typically achieved in the brain by use of stereoscopic vision, and so users with partial or complete vision loss in one eye often also lack depth perception as a result.

As a non-limiting example, consider a tennis video game being played between a user with depth perception issues and an artificial intelligence (AI), each controlling the movements and actions of a respective virtual character. The user may find it difficult to serve or return the tennis ball such that it travels over the net, due to them experiencing difficulties in determining how far away the tennis ball (or even the net) is from the user-controlled character.

Therefore, as will be appreciated by persons skilled in the art, in embodiments of the present description, it is desirable to make video game more accessible to users who have depth perception issues.

Depth Perception Assistance Apparatus

The aforementioned problem of the difficulty experienced by users with depth perception issues while playing video games can be mitigated and alleviated by implementing means to determine, for a given video game, how far away virtual elements within the video game are from, say, the location of a virtual character or virtual camera controlled by the user, for example, and subsequently adapting the appearance of said virtual elements in dependence upon their respective distances from the user-controlled virtual character/camera. The term "virtual element" as used herein may refer to, say, a (part of a) virtual character, a (part of) a virtual object, a (part of) the virtual environment, or the like.

Such means allow users with depth perception issues to more readily discern how far away virtual elements are with respect to their virtual character/camera; the adapted appearance of such virtual elements may be used by the user as a proxy for distance such that the user is more able to determine the respective distances between virtual elements and the user-controlled virtual character/camera.

Figure 2:
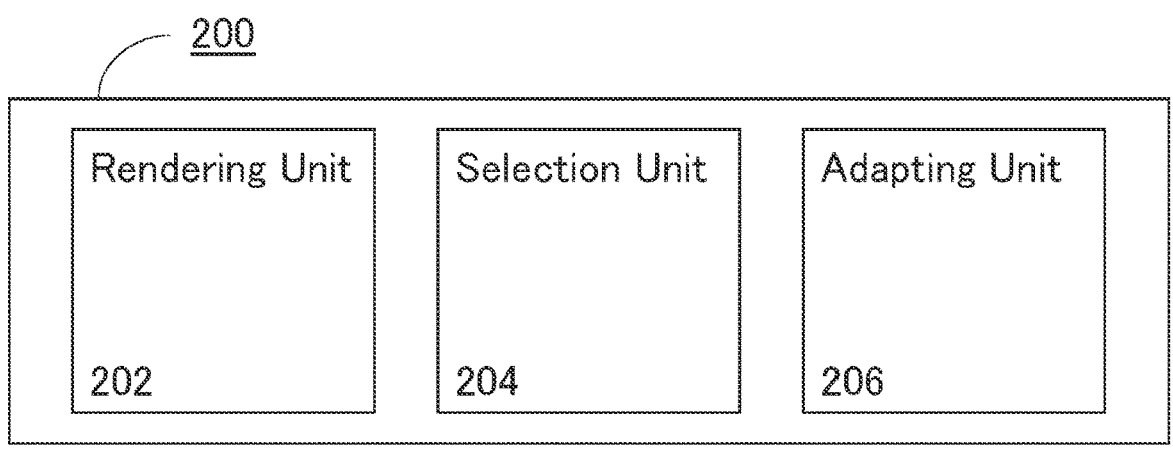
FIG. 2 schematically illustrates a visual perception assistance apparatus according to embodiments of the present description.

Accordingly, turning now to FIG. 2, in embodiments of the present description, depth perception assistance apparatus 200 comprises: rendering unit 202 configured to render, for display, a virtual environment, the virtual environment comprising one or more virtual elements; selection unit 204 configured to select one or more of the virtual elements; and adapting unit 206 configured to, for a given selected virtual element, adapt one or more aspects associated with an appearance of the given selected virtual element in dependence upon a distance between the given selected virtual element and a predetermined location within the virtual environment.

As previously mentioned, in embodiments of the present description, depth perception assistance apparatus 200 may be an entertainment system 10 such as a computer, video game console, or the like. Rendering unit 202 may be CPU 20 and/or GPU 30 operating under suitable software instruction, as may be selection unit 204 and adapting unit 206.

Embodiments of the present description make video games more accessible to users who have depth perception issues. Consider the previously described non-limiting example of the tennis video game. Rendering unit 202 may render the virtual environment of this video game, which may be, say, a virtual tennis stadium, for example. The virtual tennis stadium (virtual environment) may comprise one or more virtual elements, where each virtual element may be at least a part of a virtual character/object disposed within the virtual environment, and/or at least a part of the virtual environment itself, for example. For example, a virtual element may be, say, a subset of the mesh defining the geometry of the virtual character/object/environment. In the case of the virtual tennis game, the one or more virtual elements may correspond to, say, a tennis court, one or more stadium stands, one or more tennis balls, a user-controlled tennis player, an AI-controlled tennis player (an opponent non-player character), a plurality of other non-player characters (umpires, ball return persons, audience members, and the like), or parts thereof, for example.

As will be appreciated by persons skilled in the art, rendering is typically a computational process whereby meshes defining the geometries of virtual elements and rendering values (which define one or more aspects associated with the appearance of virtual elements) are used as input to various computational tasks, such as object physics, lighting, shading, colouring, texturing, and the like, which, respectively, determine how virtual characters/objects and/or parts of the virtual environment interact with each other, how lighting (from one or more virtual light sources) and shadows (cast from virtual elements onto themselves or onto one another) interact with the virtual elements, the colour of the virtual element, the texture of the virtual element, and the like. Therefore, the rendering process can be thought of as determining the appearance of virtual elements within the virtual environment, thereby determining the overall appearance of the virtual environment. Subsequently, the rendered virtual environment (comprising one or more rendered virtual elements) may be displayed to a user on a display screen connected to depth perception assistance apparatus 200, for example.

Subsequently, selection unit 204 may select one or more of these virtual elements. The selection of virtual elements may be based on certain criteria, for example. These criteria may relate to, say, the locations/movements of virtual elements, the visibility of virtual elements from the point of view of the virtual camera, the types of virtual characters/objects/environments within which the virtual elements are comprised, or the like, as well as any combination of the preceding, for example. These criteria are described in more detail elsewhere herein.

In the case of the virtual tennis game, selection unit 204 may select virtual elements corresponding to, say, at least part of the AI-controlled tennis player, at least part of the net that spans the centre of the tennis court, and a tennis ball which has just been served by the AI-controlled tennis player, for example. This selection may have been made using the aforementioned criteria, for example. As a non-limiting example, the AI-controlled tennis player may have been selected due to the AI-controlled tennis player satisfying a criteria relating to a type of virtual character within which a given virtual element is comprised, such as, say, a criteria specifying that virtual elements comprised within opponent/enemy non-player characters should be selected, for example. In the case of the selected net and tennis ball, criteria specifying, say, a threshold distance away from the user-controlled character a given virtual element is, a threshold velocity at which a given virtual element is travelling, whether at least part the trajectory of a given virtual element is predicted to come within a threshold distance from the user-controlled tennis player, and/or whether the given virtual element is visible from the point of view of the virtual camera, or the like, or any combination of the preceding, may have been used, for example. Types of criteria shall be discussed in greater detail later herein.

Subsequently, adapting unit 206 may adapt the appearance of the selected virtual elements in dependence upon a respective distance between each of the selected virtual elements and a predetermined location within the virtual environment. The predetermined location may be, say, the current location of a virtual character/object (either user-controlled or AI-controlled), the current location of the virtual camera (which may be user-controlled or AI-controlled), or a user-defined location within the virtual environment, for example. Adapting unit 206 may adapt the shape, size, colour, brightness, opacity, visibility, texturing, shading, outlining, or the like, of the selected virtual elements, for example. Moreover, adapting unit 206 may adapt the resolution at which the selected virtual elements are to be rendered, the animations associated with the selected virtual elements, the graphical overlays associated with the selected virtual elements, or the like, for example. In the case of the tennis video game, the respective appearances of the selected virtual elements (the net, tennis ball and AI-controlled tennis player) may each be adapted in order to make them more visually distinct from each other, thereby allowing the user to be able to rely on these more distinctive appearances as a means to determine the respective distances of the selected virtual elements from, say, the user-controlled virtual tennis player, for example.

As a non-limiting example, adapting unit 206 may employ a colour scheme for indicating distance, where virtual elements situated at the location of the user-controlled tennis player (that is to say, there is zero distance between the virtual elements and the user-controlled tennis player) may have their colour adapted such that they are now red, and virtual elements located at an upper limit threshold distance away from the user-controlled tennis player may have their colour adapted such that they are now violet. In the case of the tennis video game, depending on the upper limit distance threshold, the AI-controlled tennis player, being furthest away from the user-controlled tennis player may be coloured, say, green, blue, or violet, for example. Moreover, the net may be coloured say, orange, yellow, or green, for example. Hence in this example, elements of the environment are coloured according to distance from the predetermined point (the player's avatar or viewpoint). Furthermore, the tennis ball may have its colour dynamically adapted such that as it travels towards the user-controlled tennis player, the colour of the ball gradually changes from say green, blue, or violet, to red, for example. As will be appreciated by persons skilled in the art, this is an entirely non-limiting example; any number of adaptations to the selected virtual elements may be carried out. Moreover, an adaptation carried out on one selected virtual elements need not be applied to the remaining selected virtual elements (as was the case in the previously described rainbow colour scheme). As another non-limiting example, the AI-controlled tennis player may be made translucent due its distance from the user-controlled tennis player exceeding a first threshold distance, the tennis ball may have a "sparkle effect" graphical overlay added to it once it comes within a second threshold distance away from the user-controlled tennis player, and the net may be made brighter due its distance from the user-controlled tennis player exceeding a third threshold distance. Adapting virtual elements will be discussed in greater detail later herein.

It will be appreciated from the above examples that the visible adaptations may relate to options for interaction available to the user (for example relating to the ball speed and net) or may relate to a passive enhancement of the environment (for example relating to a colour coding of distance radiating from a predetermined point).

Therefore, embodiments of the present description make video games more accessible to users who have depth perception issues, as virtual elements of the video game may have their respective appearances adapted based on their respective distance from a predetermined location within the virtual environment (a location of a virtual character/object/ camera or a user-defined location), making the virtual elements more visually distinct from each other. Users with depth perception issues may rely on these more distinctive appearances as a means to determine the respective distances of the selected virtual elements from the predetermined location.

It will be appreciated that these embodiments may be of particular benefit for virtual reality applications, where stereoscopic distance perception may otherwise be assumed and relied upon by a game or application, but may also be of benefit for games or applications displayed on a 2D TV where the depth represented by the displayed image is inferred by the user, but this inference is nevertheless informed by real-life depth perception and so may also be affected by depth perception issues of the user.

Virtual Environments

In embodiments of the present description, as noted previously rendering unit 202 (which may be one or more CPUs 20 and/or one or more GPUs 30, as noted elsewhere herein) is configured to render, for display, a virtual environment, the virtual environment comprising one or more virtual elements.

The virtual environment may be that of a video game. In the case of the aforementioned tennis video game example, the virtual environment of the tennis video game may be a virtual tennis stadium within which games of tennis are to be played. The virtual environment may comprise one or more virtual elements, each of which may define the geometry of at least parts of virtual characters or virtual objects disposed within the virtual environment, or define the geometry of at least parts of the virtual environment itself, for example. Using the tennis video game example, the plurality of virtual elements may correspond to, say, a tennis court, one or more stadium stands, one or more tennis balls, a user-controlled tennis player, an AI-controlled tennis player (an opponent non-player character), a plurality of other non-player characters (umpires, ball return persons, audience members, and the like), or parts thereof, for example. Thus, more generally, a given virtual element may correspond to one of: at least part of a virtual object disposed within the virtual environment, at least part of a virtual character disposed within the virtual environment, and at least part of the virtual environment.

As mentioned previously, rendering is typically a computational process whereby meshes defining the geometries of virtual elements are used as input to various computational tasks, such as lighting, shading, colouring, texturing, and the like, which are used to determine the appearance of virtual elements within the virtual environment, and thereby determine the overall appearance of the virtual environment. Thus, rendering unit 202 may be configured to perform one or more of these aforementioned computational tasks such that the appearance of the virtual environment may be determined.

Virtual Element Selection

In embodiments of the present description, it is desirable to firstly select which of the virtual elements are to have their appearances subsequently adapted in dependence upon their respective distances from the predetermined location. This may be advantageous in that the computational efficiency of adapting the appearances of virtual elements is improved; rather than adapting the appearances of all virtual elements (which would be computationally burdensome), only those virtual elements which have been selected due to, say, their importance within the game (or their effect on gameplay) are selected, leading to a reduction in the number of adaptations having to be carried out in order to accommodate for users with depth perception issues.

Therefore, in embodiments of the present description, selection unit 204 (which may be one or more CPUs 20 and/or one or more GPUs 30, as noted elsewhere herein) is configured to select one or more of the virtual elements.

The selection of virtual elements may be carried out in a variety of ways. For example, selection unit 204 may be configured to select a given virtual element based on one or more user inputs from an input device, such as, say, a video game controller, mouse, keyboard, microphone, camera, or the like, the one or more user input being received by one or more data ports 60, for example.

Alternatively or in addition, selection unit 204 may be configured to select a given virtual element based on one or more criteria, these criteria enabling the automatic selection of appropriate virtual elements.

As a non-limiting example, selection unit 204 may be configured to select a given virtual element in dependence upon whether at least part of the given virtual element satisfies one or more predefined distance-based criteria applicable to a predetermined location within the virtual environment. As mentioned previously, the predetermined location may be, say, the current location of a virtual character/object (either user-controlled or AI-controlled), the current location of the virtual camera (which may be user-controlled or AI-controlled), or a user-defined location within the virtual environment, for example.

A predefined distance-based criterion may be, say, whether at least part of a virtual element lies within a threshold distance from the predetermined location, for example. Alternatively or in addition, a predefined distance-based criterion may be, say, whether at least part of a virtual element lies outside of a threshold distance from the predetermined location, for example. As will be appreciated by persons skilled in the art, the combination of these two examples of distance-based criteria may be used in order to select virtual elements that lie within a given range of distances away from the predetermined location. For example, a first distance-based criterion may be to select virtual elements that are, say, at least 20 metres away from the predetermined location. Moreover, a second distance criterion may be to select virtual elements that are, say, within 30 metres from the predetermined location. Combining these two criteria may subsequently lead to the selection of virtual elements whose distance, d, from the predetermined location lies within the range 20 metres≤d≤30 metres, for example.

Alternatively or in addition, a predefined distance-based criterion may be, say, whether at least part of a virtual element lies within a threshold range of a specified distance from the predetermined location. For example, a distance-based criterion may be to select virtual elements that are, say, 15 metres away from the predetermined location give or take 2 metres. This criterion may subsequently lead to the selection of distance, d, from the predetermined location lies within the range 13 metres≤d≤17 metres, for example. As will be appreciated by persons skilled in the art, the use of this distance-based criterion is similar in effect to that of the aforementioned combination of criteria. The distance examples given above are non-limiting and depend upon the nature of the game or optionally the current or prospective actions of the user in the game.

Alternatively or in addition, a predefined distance-based criterion may be, say, whether the predetermined location lies within (or outside of) a threshold distance from the given virtual element. Alternatively or in addition, a predefined distance-based criterion may be, say, whether the predetermined location lies within a threshold range of a specified distance away from the given virtual element.

Optionally, one or more of the predefined distance-based criteria may correspond to one or more prospective changes in state associated with one or more of the virtual elements. A prospective change in state associated with a virtual element may be, say, an action, gesture, motion, or the like, that is associated with the virtual element, for example. Such a prospective change in state may cause the virtual element to move within the virtual environment, for example.

As a non-limiting example, a prospective change in state associated with a virtual element may be a prospective motion of a virtual weapon (swinging a virtual sword, for example), the virtual element comprising at least part of the virtual weapon. In such case, a distance-based criterion may be, say, a range within which the virtual weapon can inflict damage due to a given prospective motion of the virtual weapon, for example. As will be appreciated by persons skilled in the art, the ability to inflict damage is not restricted to virtual weapons; other virtual objects not typically considered weapons (such as, say, virtual furniture in a room, for example), virtual characters, and even parts of the virtual environment (such as, toxic/radioactive/hazardous parts thereof, for example) may be capable of inflicting damage. Thus, more generally, a prospective change in state associated with a virtual element may be a prospective motion of a virtual element capable of inflicting damage, and a distance-based criterion corresponding to a prospective change in state associated with a virtual element may be a range within which the virtual element can inflict damage due to a given prospective motion of the virtual element.

Such a distance-based criterion (corresponding to a prospective change in state of a virtual element) may be applicable to the predetermined location in a variety of ways. For example, the predetermined location may be the current location of a user-controlled character who is wielding a sword. The blade of the sword may be considered a virtual element that can inflict damage upon other virtual elements (NPCs, for example). Subsequently, selection unit 204 may select a given virtual element (at least part of a given NPC, for example) because the given virtual element lies inside of a range within which the virtual element (blade of the sword) can inflict damage due to a given prospective motion of the virtual element (a prospective swing of the sword blade). In another example, an AI-controlled character (an NPC, for example) is wielding a bow and one or more arrows. The loaded arrow may be considered a virtual element that can inflict damage upon other virtual elements (the user-controlled character, for example). Consequently, selection unit 204 may select a given virtual element (at least part of the NPC that is wielding the bow and arrow, for example) because at least part of the user-controlled character (the predetermined location) lies inside of a range within which the virtual element (loaded arrow) can inflict damage due to a given prospective motion of the virtual element (a prospective shooting of the arrow). As will be appreciated by persons skilled in the art, this damage range associated with prospective virtual element motion may be utilised with respect to virtual character actions (punching, kicking, superpowers, abilities, magic spells, or the like), virtual object motions (rolling boulders, ejected debris, falling trees, vehicle motions, or the like, or even thrown/propelled objects such as furniture, cutlery, or the like), and parts of virtual environments (radioactive zones, toxic pollution zones, booby traps, landslides, avalanches, storms, tornadoes, or the like).

Alternatively or in addition, and as another non-limiting example, a prospective change in state associated with a virtual element may be a prospective action performable by a virtual character (reaching upward as if to touch a virtual object above the virtual character's head, for example), the virtual element comprising at least part of the virtual character. In such case, a distance-based criterion may be, say, an extent to which the virtual character can reach due to a given prospective action performable by the virtual character, for example. As will be appreciated by persons skilled in the art, the ability to perform actions is not restricted to virtual characters; virtual objects (magical artefacts, for example) and parts of the virtual environment may be capable of performing certain actions. Thus, more generally, a prospective change in state associated with a virtual element may be a prospective action performable by a virtual element, and a distance-based criterion corresponding to a prospective change in state associated with a virtual element may be an extent to which the virtual element can reach due to a given prospective action performable by the virtual element.

Such a distance-based criterion may be applicable to the predetermined location in ways analogous to that previously described herein. For example, the prospective action may be that performable by a user-controlled controlled character (the current location of whom is the predetermined location), and a given virtual element may be selected by selection unit 204 because the given virtual element lies within the extent to which the user-controlled character can reach due to the prospective action. Alternatively or in addition, the prospective action may be that performable by an NPC, for example, and a given virtual element (at least part of the NPC) may be selected by selection unit 204 because the user-controlled character (predetermined location) lies within the extent to which the NPC can reach due to the prospective action. As will be appreciated by persons skilled in the art, this extent of reach associated with prospective virtual element actions may be utilised with respect to other virtual character actions (pushing, grappling, climbing, jumping, crawling, or the like), virtual object actions (doors opening/closing, magical artefacts producing a magical "aura" thereabout, smoke grenades discharging smoke, fire hydrants discharging water, streetlights emitting light, or the like), and parts of the virtual environment.

Alternatively or in addition, and as another non-limiting example, a prospective change in state associated with a virtual element may be a prospective motion of a virtual object (a bowling ball being rolled, or a car braking before turning a corner, for example), the virtual element comprising at least part of the virtual object. In such case, a distance-based criterion may be, say, a distance through which the virtual object can travel due to a given prospective motion of the virtual object, for example. As will be appreciated by persons skilled in the art, the ability to move is not restricted to virtual objects; virtual characters and parts of the virtual environment may be capable of moving. Thus, more generally, a prospective change in state associated with a virtual element may be a prospective motion of a virtual element, and a distance-based criterion corresponding to a prospective change in state associated with a virtual element may be a distance through which the virtual element can travel due to a given prospective motion of the virtual element. Such a distance-based criterion may be applicable to the predetermined location in ways analogous to that previously described herein.

It will be appreciated that such a distance-based criterion, which may indicate what elements of the environment are within the range of an action or state-change of a game element under the user's control, is not the same as an aim-assist function; typically such an aim assist function shows the trajectory and/or interaction point of the action or game element based upon current inputs. To illustrate the difference, aim assist might show the trajectory and landing point for a grenade held by a user's avatar. By contrast an embodiment of the present depth perception assistance would highlight elements within a range of distances that the grenade could reach; another embodiment would show distances for example by changing colour tints/overlays on the environment every, say, 5 virtual meters, allowing the user to learn to judge for themselves where a grenade might land, from in-game observation.

That is not to say that optionally in addition, and as another non-limiting example, a prospective change in state associated with a virtual element may be a determined trajectory associated with a prospective motion of the virtual element. For example, the virtual element may be at least part of a bullet chambered in a virtual firearm, and the trajectory associated with its prospective motion (that is, being fired from the firearm) may be determined based on the position and/or orientation of the firearm, a predefined muzzle velocity associated with the bullet, and any physical forces/accelerations simulated within the virtual environment, such as gravity, wind resistance, Coriolis acceleration, or the like, for example. Rendering unit 202 may be configured to determine the trajectory associated with a prospective motion of the virtual element, for example. The term "trajectory" as used herein does not only refer to the flight paths of airborne virtual elements (a bullet fired from a gun, an aeroplane flying through the air, for example), but may also refer to the motion paths of virtual elements travelling along the surface of the virtual environment (a bowling ball travelling along a bowling lane, or a car travelling along a race track, for example), as well as seaborne virtual elements (a torpedo fired from a submarine, a boat sailing across a lake, for example), and the like. In any case, a distance-based criterion may be, say, a threshold distance from the determined trajectory, for example. In general, a prospective change in state associated with a virtual element may be a determined trajectory associated with a prospective motion of the virtual element, and a distance-based criterion corresponding to a prospective change in state associated with a virtual element may be a threshold distance from the determined trajectory associated with a prospective motion of the virtual element.

Such a distance-based criterion may be applicable to the predetermined location in a variety of ways. For example, the predetermined location may be the current location of a user-controlled character who may be holding a ball in their hand. Subsequently, rendering unit 202 may determine a trajectory associated with a prospective motion (throw) of the ball, based on, say, the position and/or orientation of the user-controlled character's hand, a force with which the rock is to be thrown, and any physical forces which could have affect the prospective motion the rock, for example. Based on this determined trajectory, selection unit 204 may select a given virtual element (at least part of a flying bird, at least part of a friendly NPC, or the like) due to the given virtual element lying within a threshold distance from the determined trajectory. In another example, a friendly NPC is holding a ball. Rendering unit 202 may determine the trajectory associated with a prospective motion (throw) of the ball, and selection unit 204 may select at least part of the NPC due to the user-controlled character (predetermined location) lying within a threshold distance of the determined trajectory.

Alternatively or in addition to trajectories associated with the prospective motions of virtual elements, the trajectories associated with the actual motion of virtual elements may be considered. Turning to the aforementioned tennis video game example, the tennis ball (which was just served by the opponent NPC) may be selected by selection unit 204 due to the user-controlled character (predetermined location) lying within a threshold distance from its trajectory, which was determined by rendering unit 202 based on, say, the current velocity of the tennis ball, and any physical forces acting upon the tennis ball, for example.

As another non-limiting example of selection criteria, and as an alternative or as an addition to the preceding, selection unit 204 may be configured to select a given virtual element in dependence upon whether at least part of the given virtual element satisfies one or more predefined motion-based criteria.

A predefined motion-based criteria may be, say, whether at least part of a virtual element is travelling at a velocity (or acceleration, or jerk, or the like) that is greater than (or less than) a threshold velocity (or acceleration, or jerk, or the like), for example. Both absolute and relative motions may be taken into consideration. For example, a motion-based criterion may be to select virtual elements that are travelling at, say, an absolute velocity greater than 20 m/s. Alternatively or in addition, another motion-based criterion may be to select virtual elements that are travelling at, say, a velocity of greater than 10 m/s relative to the predetermined location (which may be, say, a current location of a moving virtual character, for example).

Alternatively or in addition, and as another non-limiting example of selection criteria, selection unit 204 may be configured to select a given virtual element in dependence upon one of: whether at least part of the given virtual element is visible from the point of view of the virtual camera; and whether at least part of the given virtual element is predicted to be visible from the point of view of the virtual camera within a threshold period of time.

Predicting whether a given virtual element is going to be visible within a threshold time period may be carried out in various ways. For example, the prediction may be based on the motions of virtual elements and/or the motion of the virtual camera. Alternatively or in addition, the prediction may be based on one or more sounds associated with the given virtual element. For example, a virtual element comprised within, say, a virtual monster located such that it is not visible from the point of view of the virtual camera may soon after be made visible if the monster were to make a loud sound which may attract the attention of the user, who may be controlling the movement of the virtual camera.

Alternatively or in addition, and as another non-limiting example of selection criteria, selection unit 204 may be configured to select the given virtual element in dependence upon a characteristic associated with the given virtual element.

A characteristic associated with the given virtual element may be, say, a type of virtual character, virtual object, virtual environment terrain, or the like, that the given virtual element is comprised within. Types of virtual character may be, say, friendly non-player (or AI-controlled) characters (NPCs), enemy NPCs, friendly user-controlled characters (such as a teammate in a multi-player video game), enemy user-controlled characters (such as an enemy in a multi-player video game), or the like, for example. Types of virtual objects may be, say, vehicles, weapons, consumables (such as food, drink, potions, and the like), clothing/armour, tools, raw materials (for building), scenery objects (trees, boulders, streetlights, fire hydrants, and the like), or the like, for example. Types of virtual environment terrain may be, say, forests, deserts, tundra, bogs, swamps, mountainous regions, urban regions, farmlands, or the like, for example. Thus, as an example, a criterion may be to select all enemy NPCs.

As will be appreciated by persons skilled in the art, any combination of the preceding examples may be utilised in order to select one or more of the virtual elements comprised within the virtual environment.

Virtual Element Appearance

In embodiments of the present description, it is desirable to adapt the appearance of the selected virtual elements based on their respective distances from a predetermined location within the virtual environment, thereby allowing users with depth perception issues to use the adapted appearances of the virtual elements as a proxy for distance when determining the respective distances between selected virtual elements and the predetermined location.

Therefore, in embodiments of the present description, adapting unit 206 is configured to, for a given selected virtual element, adapt one or more aspects associated with an appearance of the given selected virtual element in dependence upon a distance between the given selected virtual element and a predetermined location within the virtual environment.

As will be appreciated by persons skilled in the art, the term "adapting" as used herein refers to the addition, removal, and/or modification of an aspect associated with the appearance of given selected virtual element.

As mentioned previously, the predetermined location may correspond to one selected from the list consisting of:

i. a current location of a virtual object disposed within the virtual environment;

ii. a current location of a virtual character disposed within the virtual environment;

iii. a current point of view of the virtual camera, the virtual camera being disposed within the virtual environment; and iv. a user-defined location within the virtual environment (which may be any of the preceding alternatives, or a completely different/distinct location within the virtual environment).

As will be appreciated by persons skilled in the art, the predetermined location may be static or dynamic; the current location of a virtual object may change over time due to motion, for example.

The one or more aspects associated with the appearance of the virtual elements may be one or more geometric and/or motion-based aspects associated with the at least parts of the virtual character/object/environment within which the virtual elements are comprised, and/or may be one or more rendering values that are used to render the virtual elements, for example. For example, the one or more aspects associated with the appearance of the given selected virtual element may one or more selected from the list consisting of:

i. a colour value (which may define the colour of the virtual element);

ii. a brightness value (which may define the how bright the virtual element is, or the degree to which lighting from virtual light sources is reflected from the virtual element);

iii. an opacity value (which may define the degree to which lighting passes through the virtual element);

iv. a texture value (which may define the texture of the surface represented by the virtual element);

v. a graphical overlay associated with the given virtual element (see the aforementioned sparkle overlay in the tennis video game example, or a glow/outline);

vi. a shape and/or size of the given virtual element (for example, the shape/size of the at least part of the mesh defining the geometry of the virtual element);

vii. a visibility of the given virtual element (for example, whether the given virtual element should be removed/culled from rendering process);

viii. an animation associated with the given virtual element (for example, a action/gesture/movement such as a virtual character waving a hand above their head); and ix. a resolution at which the given virtual element is to be rendered.

Optionally, adapting unit 206 may be configured to adapt one or more of the aspects associated with the appearance of the given selected virtual element in dependence upon a characteristic associated with the given virtual element. A characteristic associated with the given virtual element may be one selected from the list consisting of:

i. a type of virtual object that the given virtual element is comprised within;

ii. a type of virtual character that the given virtual element is comprised within; and iii. a type of virtual environment terrain that the given virtual element is comprised within.

See the previous discussion regarding the selection of virtual elements based on characteristics associated with the virtual element for further information.

Alternatively or in addition, adapting unit 206 may be configured to adapt one or more of the aspects associated with the appearance of the given virtual element in response to one or more user inputs.

For example, the user may choose which of the selected virtual elements are to have their appearance adapted. Alternatively or in addition, the user may choose the manner in which the selected virtual elements are to be adapted, for example. Alternatively or in addition, the user may choose the extent to which the selected virtual elements are to be adapted, for example. Alternatively or in addition, the user may wish to simply choose whether to display the adapted appearances of the selected virtual elements (that is, toggle the display of these adapted appearances). These aforementioned choices may be enacted via one or more user inputs being received from an input device, such as, say, a video game controller, mouse, keyboard, microphone, camera, or the like, the one or more user input being received by one or more data ports 60, for example.

As will be appreciated by persons skilled in the art, one or more of the adapted aspects associated with the appearance of the given selected virtual element may be utilised in the subsequent rendering of the video game by rendering unit 202, for example. Thus, rendering unit 202 may be configured to render the virtual environment in dependence upon one or more of the adapted aspects associated with the appearance of the given selected virtual element.

Hence in a summary embodiment, a depth perception assistance apparatus (such as entertainment device 10 under suitable software instruction) comprises the following. Firstly a rendering unit (e.g. GPU 30) configured to render, for display, a virtual environment, the virtual environment comprising one or more virtual elements. These elements may comprise one or more static or dynamic components of a scene, which may or may not be open to interaction with the user. Secondly, a selection unit configured to select one or more of the virtual elements. The selection may be subject to one or more criteria. For dynamic and interactive elements of the virtual environment, these criteria may reflect their dynamics and/or modes of interaction, as described elsewhere herein; meanwhile for these and for static and/or non-interactive elements, the criteria may relate to their distance from a predetermined position typically coincident with the user's viewpoint or avatar. Thirdly, an adapting unit configured to, for a given selected virtual element, adapt one or more aspects associated with an appearance of the given selected virtual element in dependence upon a distance between the given selected virtual element and a predetermined location within the virtual environment. As noted above the distance may incorporate considerations of the dynamic nature of an object or how an action may prospectively change or reach a distance, or may relate to an in-game distance or range of distances.

Figure 3:
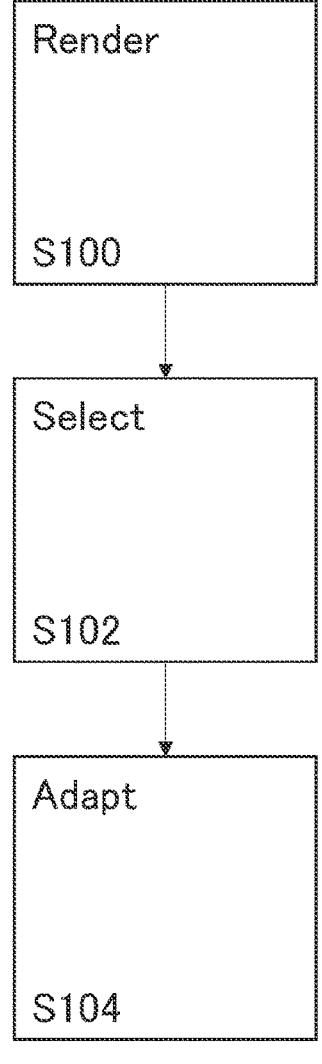
FIG. 3 schematically illustrates a visual perception assistance method according to embodiments of the present description.

Turning now to FIG. 3, a depth perception assistance method comprises the following steps: S100: rendering for display, a virtual environment, the virtual environment comprising one or more virtual elements, as described elsewhere herein. S102: select one or more of the virtual elements, as described elsewhere herein. S104: for a given selected virtual element, adapting one or more aspects associated with an appearance of the given selected virtual element in dependence upon a distance between the given selected virtual element and a predetermined location within the virtual environment.

It will be apparent to a person skilled in the art that variations in the above method corresponding to operation of the various embodiments of the apparatus as described and claimed herein are considered within the scope of the present invention.

It will be appreciated that the above methods may be carried out on conventional hardware (such as entertainment device 10) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A depth perception assistance apparatus, comprising:
a rendering unit configured to render, for display, a virtual environment, the virtual environment comprising one or more virtual elements;
a selection unit configured to select one or more of the virtual elements in dependence upon whether at least part of the one or more of the virtual elements satisfies one or more predefined motion-based criteria; and
an adapting unit configured to, for a given selected virtual element, adapt one or more aspects associated with an appearance of the given selected virtual element in dependence upon a distance between the given selected virtual element and a predetermined location within the virtual environment.

2. A depth perception assistance apparatus according to claim 1, wherein the selection unit is configured to select a given virtual element in dependence upon whether at least part of the given virtual element satisfies one or more predefined distance-based criteria applicable to the predetermined location.

3. A depth perception assistance apparatus according to claim 2, wherein one or more of the predefined distance-based criteria correspond to one or more prospective changes in state of one or more of the virtual elements.

4. A depth perception assistance apparatus according to claim 1, wherein the selection unit is configured to select a given virtual element in dependence upon one of:
i. whether at least part of the given virtual element is visible from the point of view of the virtual camera; and
ii. whether at least part of the given virtual element is predicted to be visible from the point of view of the virtual camera within a threshold period of time.

5. A depth perception assistance apparatus according to claim 1, wherein a given virtual element corresponds to one of:
i. at least part of a virtual object disposed within the virtual environment;

ii. at least part of a virtual character disposed within the virtual environment; and iii. at least part of the virtual environment.

6. A depth perception assistance apparatus according to claim 1, wherein the predetermined location corresponds to one of:

i. a current location of a virtual object disposed within the virtual environment;

ii. a current location of a virtual character disposed within the virtual environment;

iii. a current point of view of the virtual camera, the virtual camera being disposed within the virtual environment; and iv. a user-defined location within the virtual environment.

7. A depth perception assistance apparatus according to claim 1, wherein the one or more aspects associated with the appearance of the given selected virtual element are one or more of:

i. a colour value;

ii. a brightness value;

iii. an opacity value;

iv. a texture value;

v. a graphical overlay associated with the given virtual element;

vi. a shape and/or size of the given virtual element;

vii. a visibility of the given virtual element; and viii. an animation associated with the given virtual element; and ix. a resolution at which the given virtual element is to be rendered.

8. A depth perception assistance apparatus according to claim 1, wherein the adapting unit is configured to adapt one or more of the aspects associated with the appearance of the given selected virtual element in dependence upon a characteristic associated with the given virtual element.

9. A depth perception assistance apparatus according to claim 8, wherein the characteristic associated with the given virtual element is one of:

i. a type of virtual object that the given virtual element is comprised within;

ii. a type of virtual character that the given virtual element is comprised within; and iii. a type of virtual environment terrain that the given virtual element is comprised within.

10. A depth perception assistance apparatus according to claim 1, wherein the adapting unit configured to adapt one or more of the aspects associated with the appearance of the given virtual element in response to one or more user inputs.

11. A depth perception assistance method, comprising:

rendering, for display, a virtual environment, the virtual environment comprising one or more virtual elements;

selecting one or more virtual elements in dependence upon whether at least part of the one or more of the virtual elements satisfies one or more predefined motion-based criteria; and for a given selected virtual element, adapting one or more aspects associated with an appearance of the given selected virtual element in dependence upon a distance between the given selected virtual element and a predetermined location within the virtual environment.

12. A depth perception assistance method according to claim 11, wherein the selecting step comprises selecting a given virtual element in dependence upon whether at least part of the given virtual element satisfies one or more predefined distance-based criteria applicable to the predetermined location.

13. A depth perception assistance method according to claim 12, wherein one or more of the predefined distance-based criteria correspond to one or more prospective changes in state of one or more of the virtual elements.

14. A non-transitory, computer-readable storage medium containing computer program comprising computer executable instructions adapted to cause a computer system to perform a depth perception assistance method, comprising:

rendering, for display, a virtual environment, the virtual environment comprising one or more virtual elements;

selecting one or more virtual elements in dependence upon whether at least part of the one or more of the virtual elements satisfies one or more predefined motion-based criteria; and for a given selected virtual element, adapting one or more aspects associated with an appearance of the given selected virtual element in dependence upon a distance between the given selected virtual element and a predetermined location within the virtual environment.

* * * * *